Sept. 20, 1966  O. G. SIVILOTTI  3,273,819
FOIL ROLLING APPARATUS
Filed Nov. 12, 1964  2 Sheets-Sheet 1
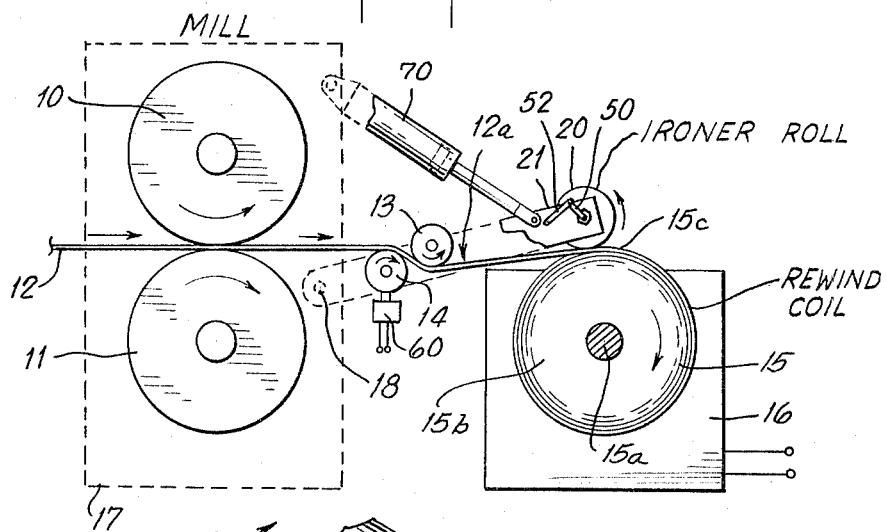
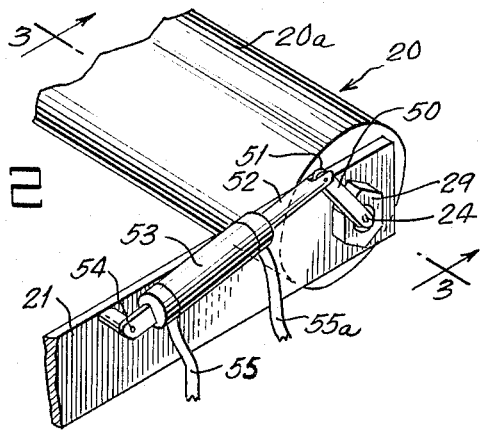
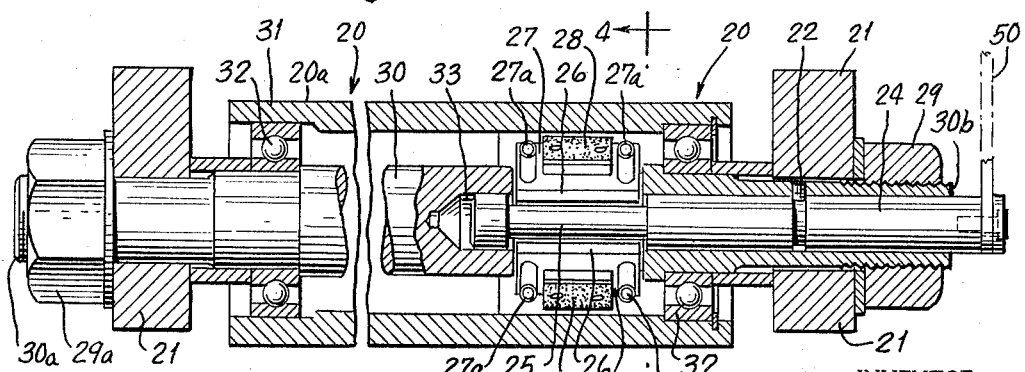
INVENTOR.
OLIVO G. SIVILOTTI
BY
Robert S. Dunham
ATTORNEY

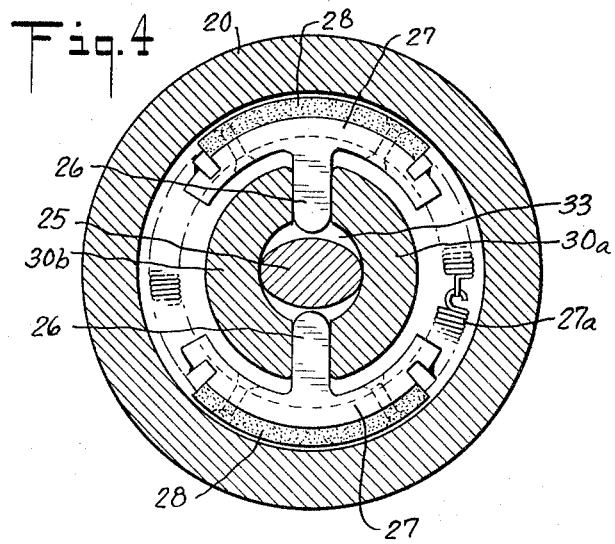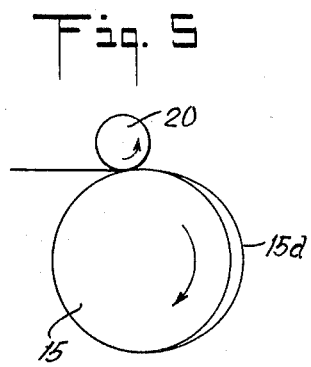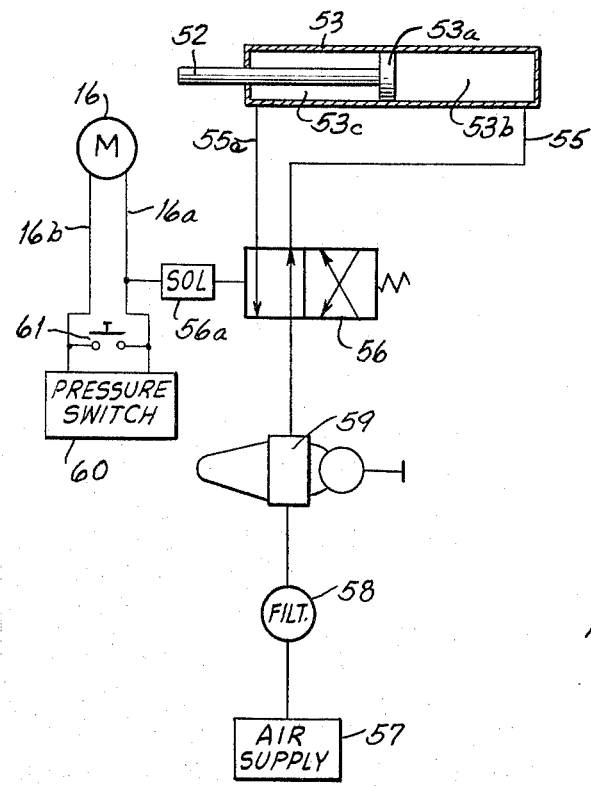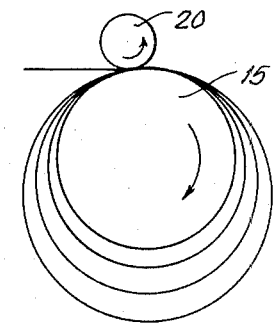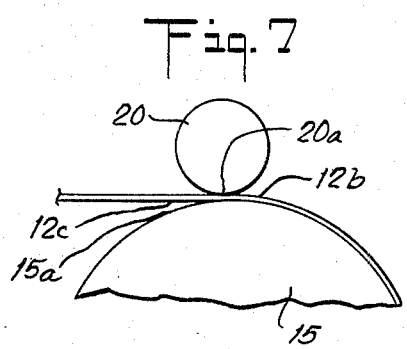

United States Patent Office 3,273,819
Patented Sept. 20, 1966

3,273,819
FOIL ROLLING APPARATUS
Olivo G. Sivilotti, Kingston, Ontario, Canada, assignor to Aluminium Laboratories Limited, Montreal, Quebec, Canada, a corporation of Canada
Filed Nov. 12, 1964, Ser. No. 410,650
7 Claims. (Cl. 242—78.1)

This invention relates to foil rolling, and more particularly relates to apparatus for the prevention of dynamic back-lash during the winding of foil onto a coil.

In all situations where a relatively stiff but windable material is wound at high speed onto a coil, the problem of back-lash, hereinafter defined, is likely to occur. For purposes of discussion and illustration back-lash will be described herein only in connection with the rapid winding of aluminum foil onto a coil, although metals in general and other materials exhibit the same problem. The invention applies equally to all materials exhibiting the back-lash problem.

Modern aluminum rolling mills produce foil at extremely high linear speeds. The foil, in order to be desirable commercially, must be completely free of surface imperfections such as are caused by kinking, creasing or other non-uniform bending of the surface. It has been found that one of the largest sources of imperfect foil occurs in the winding operation wherein the foil is taken at high speed and wound onto large storage coils.

In a typical aluminum foil rolling mill, the foil emerges from the rolling operation at a very high linear speed, and is power-wound onto rewind spools at an equal linear rate. This powered take-up results in a winding tension in the foil approaching the coil, which tension insures smooth layering of the foil on the coil in conjunction with the ironer-roll. The purpose of the ironer-roll is to insure that no air pockets are trapped between the new layer of foil and the previous bed of layers, since air pockets can cause wrinkling or creasing of the foil. The ironer-roll smoothly presses the newly added foil against the coil at the roughly tangential point where it is added thereto. The ironer-roll runs free on the coil, that is, it runs at the surface linear speed of the foil with which it is in contact, which is of course both the speed of the newly adding foil and the equal speed of the outermost layer of the coil.

The phenomenon of back-lash occurs when the outermost layer or layers of foil on the coil start to travel faster than the main body or inner layers of the coil. This results in loosening up of the coil progressively and rapidly, and finally in springing of the layers into a loose configuration wherein many layers are flexed, buckled, or creased, so that all or a large portion of the coil is unusable commercially because of its non-smooth or "spoiled" surface finish.

The main cause of back-lash resides in the deceleration of the coil, which must be imposed when a coil reaches the fully wound condition or when a break in the foil has occurred. In either event, the winding tension lost, and a free end of foil flaps around and around the coil. The outer layers of foil have more momentum than the inner layers, and when the coil is decelerated to stop it (for storage or repair) the outer layer tends to unwind from the rewind spool. This natural tendency of the coil to unwind during deceleration, and resulting from the momentum of the outer foil layers themselves, will be termed primary back-lash hereinafter, in contradistinction to secondary back-lash, hereinafter defined. The ironer-roll in continuing to press the outer layer against the roll, prevents the outer foil layers from so unwinding, that is, prevents primary back-lash. Unfortunately however, the ironer-roll itself has considerable momentum, and during the deceleration cycle the ironer-roll (at high foil feed rates) tends to move at a greater surface speed than the coil. In other words, the ironer-roll tends to decelerate more slowly than the rewind coil. This feeds the outer or newly accepted layer of foil at a faster rate than the coil can take it up, and secondary back-lash results. That is, the extra foil so fed separates from the circumference of the coil, and that condition rapidly spreads to lower layers under the continued influence of the ironer-roll and the momentum effect of the adjacent inner foil layers during deceleration of the coil. The result is a sprung coil due to this secondary back-lash.

The total effect of any form of back-lash is to lower production efficiency and thus to raise production costs. Not only is the back-lashed coil lost, but production must always proceed at conservative linear foil rates so as to help avoid the back-lash in the first place. The present invention is directed to the problem of ironer-roll initiated, or secondary back-lash, since use of an ironer-roll is presumed and such use prevents primary back-lash. Secondary back-lash does not always occur, since it depends for its completion upon several factors such as the lubricity of the surfaces involved, the diameter of the coil at the time of the break or other release of the foil end, and the speed of foil feed, as well as the profile of the deceleration curve. While these factors add or subtract to make secondary back-lash unpredictable in a given instance, it is nevertheless an observed fact that the likelihood of back-lash increases greatly with foil feed speed. When a critical amount of override occurs between the ironer-roll and the foil surface, the latter will begin to peel off (against friction with the next inner layer) from the coil, and secondary back-lash begins.

It is accordingly a principal object of the present invention to provide means for preventing back-lash in a high speed foil winding operation.

Another object of the invention is to provide apparatus adapted to prevent the occurrence of back-lash induced during high speed foil winding by an ironer-roll employed therewith.

Another object of the invention is the improvement of the productivity of commercial grade foil from foil rolling mills.

Another object of the invention is the attainment of economy and efficiency in foil rolling by the prevention of the back-lash phenomenon.

Another object of the invention is the attainment of higher production speeds in foil rolling apparatus without resultant danger of rewind coil back-lash.

These and other objects and advantages and features of the invention will be more fully understood and appreciated upon examination of the hereinbelow contained detailed description of a presently preferred but nevertheless illustrative embodiment of the inventive principles, with reference to the appended drawings, wherein like reference characters denote like parts in all views thereof, and wherein:

FIGURE 1 is a highly schematic side view of certain elements of a foil rolling mill together with a rewind coil and ironer-roll in the process of accepting foil from the mill;

FIGURE 2 is a partial detail of one end of the ironer-roll and associated apparatus according to the invention;

FIGURE 3 is a partial section view of a portion of the apparatus shown in FIGURE 2 and taken along line 3—3 therein showing internal details of construction thereof;

FIGURE 4 is an end section view taken along line 4—4 of FIGURE 3;

FIGURE 5 is a view of the rewind coil and ironer-roller of FIGURE 1 showing the inception of back-lash;

FIGURE 6 is a view of the parts shown in FIGURE 5 after the rewind coil has completely back-lashed to a sprung condition;

FIGURE 7 is an enlarged detail of a portion of the parts of FIGURE 5 showing the relationship of the various surfaces; and FIGURE 8 is a schematic diagram of the relationship between the elements of the invention.

Referring now to the figures, and particularly to FIGURE 1, a typical foil rolling mill may involve one or more pairs of heavy reduction rollers 10 and 11 (one pair is shown for simplicity) which operate upon a continuous web or sheet of aluminum 12 so as to eventually reduce the size of sheet 12 to foil thickness. A final pair of idler rollers 13 and 14 are sometimes used to maintain a constant pass-line (the foil issuing from the rollers 10 and 11 remains at the same elevation during coil build-up) before the foil is fed to a rewind coil. Rewind coil 15 constitutes an inner spool 15a together with a plurality of layers 15b forming the main bulk of the coil and comprised of previously wound layers of foil sheet 12. The spool 15a of rewind coil 15 is driven by a motor drive 16 so as to supply sufficient torque to place the portion 12a of foil sheet 12 in a state of winding tension. The tension exists between the nip of rollers 10, 11, and the tangential point of take-up on the outer periphery 15c of rewind coil 15.

The general framework of the mill is indicated schematically in phantom outline at 17. Pivoted at 18 to the general framework of mill 17 is a pair of rocker arms 21 shown partially in phantom outline and partially in full outline. Rocker arms 21 cooperate to pivotably restrain ironer-roller 20 at either end thereof in such a fashion as to present the outer periphery of ironer-roller 20 flushly against the outer periphery of rewind coil 15 at approximately the tangential point of application 15c of the foil 12a to the rewind coil 15. As indicated by the curved arrows in FIGURE 1, rollers 10 and 13 rotate counter-clockwise, and rollers 11 and 14 rotate clockwise, both as viewed in the drawing. Rewind coil 15 is powered by motor 16 to move clockwise so as to take up foil 12, which as indicated by the straight arrows, moves from left to right as viewed in FIGURE 1. Ironer-roll 20 is forced by its weight and by the action of fluid-actuated cylinder 70 to press against the outer periphery of rewind coil 15, and thus to press the incoming foil 12a closely against the already wound layers 15b of rewind coil 15. The purpose of this prior art ironer-roll 20 is, as has already been mentioned, to ensure the smooth application (without air pockets and consequent wrinkling) of foil 12a to rewind coil 15. Because of the friction between the outer periphery of rewind coil 15 and ironer-roll 20, the roll 20 is caused to rotate in the counter-clockwise direction in FIGURE 1 as shown, at an angular speed such that the outer surface of roll 20 and the outer periphery of rewind coil 15 travel at the same surface velocity. Thus normally there is no surface slippage or ironer-roll 20 with respect to rewind coil 15.

The phenomenon of back-lash occurs in one or the other of the following ways. When foil 12 is being produced and delivered to rewind coil 15 and if the end of the continuous foil web 12 passes the nip of rollers 10, 11, either because rewind coil 15 is being terminated or because of unintended break in the web 12, the tension which normally occurs in web portion 12a is released. The motor drive 16 will then be decelerated either manually by the operator pressing the stop push-button 61 on the control panel (not shown), or automatically, for example by the action of pressure sensitive switch 60 which is installed between the idler roll 14 and its lateral supports. The rewind coil 15 will then be stopped and removed. Meanwhile a free end of foil web 12 will travel around the outer periphery of rewind coil 15 in the clockwise direction. During deceleration this free end and the other outer layers of foil at rewind coil 15 will be subjected to a force which is proportional to the decrease in momentum which they experience during deceleration. This force is in a direction to unwind the said outer layers. The tendency of this force is thus to produce a primary back-lash. These outer foil layers are prevented from unwinding into a primary back-lash principally because of the restraining pressure exerted on the outer layer by ironer-roll 20.

However, ironer-roll 20 itself contributes to back-lash by the different mechanism of secondary back-lash, as aforesaid. As may be observed in FIGURE 1, ironer-roll 20 necessarily rotates in a sense opposite to that of rewind coil 15. Specifically as viewed in FIGURE 1, ironer-roll 20 rotates in the counter-clockwise direction while rewind coil 15 rotates in the clockwise direction. Consequently, during deceleration of rewind coil 15 ironer-roll 20 is also decelerated at an equal pace so long as no slippage occurs between surface 20a and surface 12b or between surface 15a and surface 12c, all as viewed in FIGURE 7. In others, ironer-roll 20 is coupled at its surface to rewind coil 15 through a single layer of foil 12, and consequently unless there is some slippage, the surface speed of ironer-roll 20 must be equal to the surface speed of rewind coil 15. However during deceleration the lubricity of the surfaces and the other variables already mentioned, ofter combine above a certain critical linear speed of foil web 12 to allow such slippage.

The mechanism by which such ironer-roll produced or secondary back-lash is initiated is as follows. Ironer-roll 20 has, in order to perform its function, a considerable mass and consequently a considerable momentum at the high foil speeds in question. The momentum of ironer-roll 20 is decreased during deceleration of rewind coil 15 by the force which is coupled to ironer-roll 20 through surfaces 15a, 12c, 12b, and 20a, and thence to the ironer-roll itself, as aforesaid. When the friction force which must be so transmitted reaches a certain critical amount, depending upon the deceleration profile and the lubricity of the surfaces involved and the like, the surface speed of surface 15a will be slowed to a speed below the surface speed of surface 20a, in other words, surface 12c will begin to slip upon surface 15a, as is best shown in FIGURES 5 and 7.

The sum total effect of this is that, in prior art rolling mills employing ironer-rolls 20, during the deceleration cycle of the rewind coil 15 the momentum of the ironer-roll 20 itself has often and especially at higher linear feed rates of foil web 12, initialy caused a springing out of the outer layer of rewind coil 15 as is shown in FIGURE 5, by virtue of the greater surface speed at 20a of ironer-roll 20 as opposed to the surface speed at 15a of rewind coil 15, so that the bulge 15d in rewind coil 15 is rapidly produced from the resulting higher speed of the newly accepted foil 12 with respect to the coil 15 outer surface. The initial bulge 15d rapidly finds its way around the spiral foil wrapping of rewind coil 15 to produce by secondary back-lash a sprung coil as is schematically shown in FIGURE 6.

The reason the coil of FIGURE 5 rapidly becomes the coil of FIGURE 6 is threefold. Firstly, the greater angular speed of ironer-roll 20 as compared to rewind coil 15 tends to be continuous over a period of time. Secondly, after bulge 15d has been separated from the main body of rewind coil 15 there is still friction between it and the inner layers of foil just under ironer-roll 20. Thirdly, the momentum of the next adjacent inner layers of foil has a constant tendency to unwind rewind coil 15 during the deceleration thereof. These three effects combine to rapidly spring the entire rewind coil 15 or at least a substantial portion thereof to the appearance schematically shown in FIGURE 6. This occurs because the greater speed of ironer-roll 20 acts by its friction effect to peel off adjacent lower layers of foil, and it is aided to do that by the unwinding tendency of the layers themselves produced by the deceleration effect thereon. As has already been pointed out, once a coil 15 is sprung as is shown in FIGURE 6 there is bound to be surface damage of the wrinkling or creasing sort throughout, and also during subsequent handling a sprung coil is even further damaged.

It has now been found that back-lash of the type just described, that is secondary back-lash, can be completely avoided by means of the combination of apparatus according to the present invention, which will hereinafter be described. Heretofore, many solutions have been proposed for this secondary back-lash problem, but none have been satisfactory. For example it has been proposed to lift the ironer-roll 20 away from the rewind coil 15 during deceleration of rewind coil 15 so as to prevent the inception of secondary back-lash. Such attempts have been totally unsatisfactory because the ironer-roll performs a useful function during deceleration of rewind coil 15 by being in contact therewith, in that primary back-lash caused by the natural unwinding tendency of the outer layers of foil is avoided thereby. In order to avoid ironer-roll caused secondary back-lash, rolling mills have had to be operated at linear rates considerably below what was possible. The frequent occurrences of back-lash which occurred even at these reduced linear rates destroyed considerable portions of the mills output. Despite these difficulties no solution to this problem has heretofore been forthcoming. Such a solution would, as aforesaid, greatly increase productivity and economy of a mill by allowing higher winding speeds and by also reducing back-lash damaged rolls.

Briefly, the present invention provides means for sensing the instantaneous deceleration of rewind coil 15, and decelerating ironer-roll 20 at a substantially equal rate sufficient to prevent slippage between the surfaces 12c and 15a shown in FIGURE 7. In an illustrative embodiment the invention contemplates sensing deceleration of rewind coil 15 and applying braking force to ironer-roll 20 in the form of an internal mechanical brake to decelerate ironer-roll 20.

An illustrative embodiment of a braking arrangement for ironer-roll 20 is shown externally in FIGURE 2. A fixed axial shaft of ironer-roll 20 is journalled in rocker arm 21 by means described hereinafter. Nut 29 secures the journalling means, and emerging from the center of nut 29 is shaft 24 which rides axially within the said journalling means. Shaft 24 is rotatable independent of the rotation of the outer surface 20a of ironer-roll 20, and constitutes a rotatably controllable means for employing the internal braking mechanism contained within ironer-roll 20 and to be described hereinafter. Attached to shaft 24 is arm 50 which is connected at its upper end 51 with the operating rod 52 of an air actuating cylinder 53. Air cylinder 53 may be of standard configuration and essentially operates to respond to air pressure signals at feed lines 55, 55a, to move by means of an internal plunger, the operating rod 52 in a reciprocating direction sufficient to operate shaft 24 via arm 50 through a considerable angle such as for example 90°. Air cylinder 53 is pivoted at 54 to rocker arm 21 so as to allow pivotal movement thereat to accommodate the arcuate movement of the other end of cylinder 53 to accommodate the motion of arm 50.

The internal details of construction of an example braking means for use with ironer-roll 20 are shown in FIGURES 3 and 4. The ironer-roll 20 comprises an inner support shaft 30 which is journalled at the opposite ends thereof in the pair of rocker arms 21. Riding on central shaft 30 is a concentric cylindrical roller portion 31 the outer surface 20a of which does the actual contacting of foil 12 as already described. Roller portion 31 is carried upon central shaft 30 by means of a pair of ball bearing assemblies 32 situated at the ends thereof adjacent rocker arms 21. The roller portion 31 is thereby disposed to rotate freely upon the central shaft 30. The end 30a of shaft 30 is secured by means of nut 29a, and the opposed end 30b of shaft 30 is secured by means of nut 29.

At one end of central shaft 30 there is situated an axial bore 33 extending inwardly from shaft end 30b a sufficient distance past the adjacent ball bearing assembly 32 to accommodate a braking mechanism. Inner operating shaft 24 is journalled within the bore 33 in shaft 30 and is retained by set screw 22. A portion 25 of shaft 24 is approximately elliptically shaped and serves a cam function. Disposed adjacent to cam portion 25 is a pair of brake shoes 27 including brake linings 28 and shaped to conform to the inner cylindrical surface of roller 31. Each brake shoe 27 includes a radially inwardly extending guide member 26, which member 26 extends along the entire axial length of the brake shoe. Each guide member 26 is nested in a slot defined by the opposed portions 30a, 30b, of central shaft 30. The slots thus defined extend also for the length of brake shoes 27 so as to accommodate the entire length of guide members 26, and guide members 26 are thereby disposed to communicate with the interior of axial bore 33 wherein cam portion 25 of operating shaft 24 is located as aforesaid. Springs 27a are attached to brake shoes 27 so as to bias the shoes 27 away from contact with the interior surface of roller 31.

Referring now to FIGURES 2, 3, and 4, arm 50 may be moved by air cylinder 53 so as to axially rotate shaft 24. Rotation of shaft 24 causes the cam portion 25 thereof to be rotated between a position wherein the guide members 26 of brake shoes 27 are free of cam portion 25 (as shown), to a position wherein the cam portion 25 intercepts the guide members 26 and drives the brake shoes 27 radially outward. The rotation of shaft 24 thus moves the internal parts so that braking force is applied between the brake linings 28 and the inner surface of roller 31 against the aforesaid spring bias. Variations in the amount of axial rotation of shaft 24 controls, through cam 25, the amount of thrust applied to guide members 26 and thereby the amount of braking force applied.

Referring now to FIGURES 2 and 8, air cylinder 53 has its two lines 55, 55a, connected to a four-way solenoid controlled valve 56 having a solenoid control coil 56a. A suitable valve is for example an ASCO one-quarter inch valve, model #10–250. Compressed air is supplied to the input of solenoid controlled valve 56 from an air supply indicated schematically at 57, which may be any suitable supply such as compressed gas lines or bottles and the like. The compressed air is fed from supply 57 through filter 58 and to pressure reduction valve 59 and thence to the input side of solenoid control valve 56. Filter 58 may be for example, a Norgren one-half inch filter, model #0–41–4. Reduction valve 59 may be for example, a Norgren one-half inch 125 p.s.i. reduction valve. Air cylinder 53 may be any convenient double acting air cylinder equipped with a piston 53a for actuation of operating rod 52. A single action air cylinder may also be used, with biasing, for example. A reduction valve is not always necessary, but when compressed air at elevated pressures is employed it is convenient to employ reduction valve 59 to reduce the pressure supply to air cylinder 53 to approximately 15 p.s.i. or the like. It should be clearly understood that this equipment is merely illustrative.

The solenoid coil 56a is responsive to a signal in line 16a which causes motor drive 16 to decelerate the rewind coil 15. Lines 16a and 16b control motor drive 16 in its deceleration phase in response to a deceleration signal obtained from the pressure switch 60 under the idler roller 14, or alternatively by a manually operable pushbutton 61 within access of the machine's attendant. Of course rewind coil 15 may be decelerated by any of several techniques, such as for example removing power from motor drive 16, or reversing the power on motor drive 16, or by braking either motor drive 16 or rewind coil 15 itself, and the like. It will be understood that while motor drive 16 is itself shown in FIGURE 8 as being the decelerating means controlled by deceleration switch 60 through lines 16a, 16b, that any of these alternative means for decelerating rewind coil 15 may be substituted therefor. Also any other suitable decelerating means may be employed. In any event when the decelerating means is actuated by means of lines 16a, 16b, solenoid coil 56a is simultaneously actuated, and causes valve 56 to supply air pressure to side 53b of air cylinder 53 thus driving operating rod 52 to the left as viewed in FIGURE 8. This action moves arm 50 so as to turn cammed portion 25 of operating shaft 24, as is best shown in FIGURE 4, from a position wherein the cam does not intercept the guide members 26, to a position wherein the guide members 26 are intercepted and braking action is thereby applied by brake shoes 27 as aforesaid.

Thus when rewind coil 15 is decelerated (by whatever specific means are chosen), the chain of elements 56a, 56, 53, 52, 50, 24, 25, 26, 27, 28, cause braking simultaneously therewith of ironer-roll 20. The parts are arranged so that when deceleration of rewind coil 15 is removed (as for example when rewind coil 15 is completely stopped or is started up again) solenoid coil 56a responds to this condition in line 16a by changing valve 56 so that compressed air is supplied to side 53c of air cylinder 53 and piston 53a is driven toward the right in FIGURE 8 so as to re-attain its initial position wherein operating rod 52 moves the series of elements just described so as to remove the braking action from ironer-roll 20.

The relationship between the deceleration of rewind coil 15 and the braking of ironer-roll 20 may be calibrated as follows. The minimum amount of air admitted to side 53b of air cylinder 53 is preferably determined by adjusting reduction valve 59 so that when ironer-roll 20 is lifted out of contact with rewind coil 15, and rewind coil 15 is subjected to an emergency stop (that is, deceleration of maximum intensity), the braking of ironer-roll 20 matches the deceleration of rewind coil 15. That is to say, the minimum point is that point at which the surface speed reduction of ironer-roll 20 matches the surface speed reduction of rewind coil 15. This minimum point is of course approximate in the nature of the operation of rolling mill equipment. The maximum air pressure is determined by allowing ironer-roll 20 to contact rewind coil 15 with normal operating pressure, and with a normally rotating coil 15 to observe the setting of reducing valve 59 which causes sufficient braking of ironer-roll 20 to cause ironer-roll 20 to skid on the rotating surface of rewind coil 15. Reducing valve 59 may be set within these limits to give satisfactory operation of the apparatus. A setting essentially equidistant between the minimum and maximum settings is often advantageous, but in general the setting can be anywhere within the limits defined, depending upon what is required for satisfactory operation in the exact environmental conditions. By satisfactory operation is meant that condition wherein when rewind coil 15 is decelerated to a stop because of the end of the mill run or because of a break in foil 12, ironer-roll 20 either decelerates at substantially the same rate, or if it decelerates more slowly its greater speed is not sufficient to overcome the friction between foil surface 12c and rewind coil surface 15a as shown in FIGURE 7, with the consequence that secondary back-lash is not induced.

In operation, foil 12 may be operated at relatively high feed rates, for example 3000 feet per minute and over, and normal deceleration cycles may be practiced on rewind coil 15 without any difficulty due to secondary back-lash, because the apparatus as described will provide sufficient braking of ironer-roll 20 to prevent the critical force between surfaces 12c and 15a (FIGURE 7) necessary to overcome friction and start the new layer of foil bulging as shown in FIGURE 5. Moreover when an unintended break in the foil 12 occurs a panic stop may also be executed without any back-lash problems because of the same operation of the inventive apparatus. It has been found that back-lash very frequently occurs when an ironer-roll 20 without braking is employed, even at foil feed rates as low as 1500 feet per minute. On the other hand, when braking as taught in the present invention is employed, feed rates of 3000 feet per minute and over may be practiced without any secondary back-lash or back-lash of any nature. Thus in addition to the advantage of not having a certain percentage of each day's production ruined because of back-lash imperfections, the invention allows production rates of twice and more that possible without the benefit of the invention. The combination of less spoilage and greater production rates obviously is an important advantage in this art.

The Table I contained hereinbelow will serve to indicate the advantages of the invention.

TABLE I

| Coil Diameter | Foil Feed, f.p.m. | Deceleration Time (min.) | Braking | Back-lash |
|---|---|---|---|---|
| 22¾" | 2,800 | 0.20 | Yes | No. |
| 33¼" | 2,500 | 0.19 | Yes | No. |
| 12¼" | 3,200 | 0.07 | Yes | No. |
| 21¼" | 1,500 | 0.18 | No | Yes. |
| 13¾" | 1,500 | 0.08 | No | Severe. |
| 23¾" | 2,500 | 0.19 | No | Do. |

As is shown in Table I coils of various diameters travelling at various feed rates of foil 12 were decelerated at various rates of deceleration and in each instance where braking of ironer-roll 20 according to the invention was practiced, no back-lash occurred. On the other hand even at sharply reduced feed rates of foil 12 back-lash occurred when braking in accordance with the invention was not practiced.

What has been described is a combination of means which completely avoids the difficulty of secondary back-lash by decelerating the ironer-roll 20 during deceleration of rewind coil 15, and at a sufficient rate so that ironer-roll 20 does not override rewind coil 15 sufficiently to peel off the outer layer thereof (that is the newly adding layer) to thus initiate the secondary back-lash. By so preventing secondary back-lash the apparatus combination according to the invention sharply reduces foil spoilage and additionally allows a very large increase in mill speeds.

While the invention has been described with regard to a specific embodiment, it will be understood that that embodiment is merely illustrative, not limiting. For example other means for decelerating ironer-roll 20 are contemplated, and it is not intended that a mechanical brake must be employed. Similarly, it is to be understood that broadly the apparatus represents means responsive to deceleration of rewind coil 15 by decelerating ironer-roll 20 at a rate sufficient to prevent secondary back-lash. The specific means for decelerating rewind coil 15 and ironer-roll 20 are merely illustrative. These and other changes and substitutions in the form and nature of the elements of the combination of the invention may be made without departing from the spirit and scope of the invention as defined in the appended claims.

What is claimed is:

1. In high speed equipment for winding foil and including rotatable means for accepting wound layers of foil, motive means for rotating said rotatable means so as to wind said foil thereon to constitute a reel of layers, an ironer-roll rotatably adapted to ride against the outermost layer of foil on said reel, and foil winding deceleration means for decelerating said rotatable means and thereby said reel, the improvement comprising means responsive to said foil winding deceleration means for decelerating said ironer-roll.

2. In high speed equipment for winding foil and including rotatable means for accepting wound layers of foil, motive means for rotating said rotatable means so as to wind said foil thereon to constitute a reel of layers, an ironer-roll rotatably adapted to ride against the outermost layer of foil on said reel, and foil winding deceleration means for decelerating said rotatable means and thereby said reel, the improvement comprising sensing means for sensing the imposition of deceleration on said rotatable means, and ironer-roll deceleration means responsive to said sensing means.

3. In high speed equipment for winding foil and including rotatable means for accepting wound layers of foil, motive means for rotating said rotatable means so as to wind said foil thereon to constitute a reel of layers, an ironer-roll rotatably adapted to ride against the outermost layer of foil on said reel, and foil winding deceleration means for decelerating said rotatable means and thereby said reel, the improvement comprising sensing means for sensing the imposition of deceleration on said rotatable means, and ironer-roll deceleration means responsive to said sensing means by decelerating said ironer-roll at a rate sufficient to prevent back-lash.

4. In high speed equipment for winding foil and including rotatable means for accepting wound layers of foil, motive means for rotating said rotatable means so as to wind said foil thereon to constitute a reel of layers, an ironer-roll rotatably adapted to ride against the outermost layer of foil on said reel, and foil winding deceleration means for decelerating said rotatable means and thereby said reel, the improvement comprising sensing means for sensing the imposition of deceleration on said rotatable means, braking means associated with said ironer-roll and adapted to apply braking torque to said ironer-roll, said braking means being responsive to said sensing means by decelerating said ironer-roll at a rate sufficient to prevent said outermost layer of foil from movement relative to the next adjacent inner layer of foil.

5. In high speed equipment for winding foil and including rotatable means for accepting wound layers of foil, motive means for rotating said rotatable means so as to wind said foil thereon to constitute a reel of layers, an ironer-roll rotatably adapted to ride against the outermost layer of foil on said reel, and foil winding deceleration means for decelerating said rotatable means and thereby said reel, the improvement comprising sensing means for sensing the imposition of deceleration on said rotatable means, braking means associated with said ironer-roll for applying braking torque thereto, said braking means being responsive to said sensing means so as to decelerate said ironer-roll at a rate substantially equal to the rate of deceleration of said rotatable means sufficient to prevent back-lash.

6. In high speed equipment for winding foil and including rotatable means for accepting wound layers of foil, motive means for rotating said rotatable means so as to wind said foil thereon to constitute a reel of layers, an ironer-roll rotatably adapted to ride against the outermost layer of foil on said reel, and foil winding deceleration means for decelerating said rotatable means and thereby said reel, the improvement comprising sensing means responsive to the imposition of deceleration on said rotatable means, braking means associated with said ironer-roll and adapted to apply selected degrees of braking torque thereto, fluid actuatable means responsive to said sensing means so as to actuate said braking means in response to said rotatable means deceleration, said fluid-actuatable means and braking means being disposed to cooperate to decelerate said ironer-roll at a rate substantially equal to the rate of deceleration of said rotatable means sufficient to prevent sliding of said outermost layer of foil on said reel in a direction tending to unwind said reel.

7. In high speed equipment for winding foil and including rotatable means for accepting wound layers of foil, motive means for rotating said rotatable means so as to wind said foil thereon to constitute a reel of layers, an ironer-rotatably adapted to ride against the outermost layer of foil on said reel, and foil winding deceleration means for decelerating said rotatable means and thereby said reel, the improvement comprising sensing means responsive to the imposition of deceleration on said rotatable means, braking means disposed internally of said ironer-roll and adapted to apply selected degrees of braking torque thereto, pneumatic means responsive to said sensing means so as to actuate said braking means in response to said rotatable means deceleration, said pneumatic means and braking means being disposed to cooperate to decelerate said ironer-roll at a rate substantially equal to the rate of deceleration of said rotatable means sufficient to prevent sliding of said outermost layer of foil on said reel in a direction tending to unwind said reel.

References Cited by the Examiner
UNITED STATES PATENTS

| | | | |
|---|---|---|---|
| 1,093,913 | 4/1914 | Church | 242—65 |
| 2,733,018 | 1/1956 | Nitchie | 242—66 |
| 2,935,273 | 5/1960 | Hoeffgen et al. | 242—78.1 X |

FRANK J. COHEN, *Primary Examiner.*

MERVIN STEIN, *Examiner.*

N. L. MINTZ, *Assistant Examiner.*

UNITED STATES PATENT OFFICE
CERTIFICATE OF CORRECTION

Patent No. 3,273,819                          September 20, 1966

Olivo G. Sivilotti

It is hereby certified that error appears in the above numbered patent requiring correction and that the said Letters Patent should read as corrected below.

Column 1, line 59, before "lost" insert -- is --; column 3, line 57, for "or" read -- of --; column 4, line 20, for "In others" read -- In other words --; line 48, for "initialy" read -- initially --; column 10, line 25, for "ironer-rotatably" read -- ironer-roll rotatably --.

Signed and sealed this 1st day of August 1967.

(SEAL)
Attest:

EDWARD M. FLETCHER, JR.
Attesting Officer

EDWARD J. BRENNER
Commissioner of Patents